United States Patent [19]

DiCesare et al.

[11] Patent Number: 4,720,623
[45] Date of Patent: Jan. 19, 1988

[54] POWER CONTROL DEVICE FOR A RESISTANCE HEATER IN AN OVEN

[75] Inventors: John M. DiCesare, Wilmington; Ludwig C. Semanski, New Castle, both of Del.

[73] Assignee: E. I. Du Pont de Nemours and Company, Wilmington, Del.

[21] Appl. No.: 858,171

[22] Filed: May 1, 1986

[51] Int. Cl.[4] .............................. H05B 1/02
[52] U.S. Cl. .................... 219/497; 219/501; 219/496; 219/505; 323/236
[58] Field of Search ............... 219/491, 501, 508, 494, 219/497, 499, 505, 496; 323/235, 242, 236, 319, 102; 236/14 BG, 46 R

[56] References Cited

U.S. PATENT DOCUMENTS

| | | | |
|---|---|---|---|
| Re. 29,288 | 7/1977 | Schilling | 73/101 |
| 3,417,608 | 12/1968 | Barigant | 73/67.1 |
| 3,553,428 | 1/1971 | McGhee | 219/494 |
| 3,752,956 | 8/1973 | Cahill et al. | 219/505 |
| 3,961,236 | 6/1976 | Rodek et al. | 323/18 |
| 4,034,602 | 7/1977 | Woo et al. | 73/67.2 |
| 4,049,997 | 9/1977 | McGhee | 318/128 |
| 4,162,379 | 7/1979 | Sebens et al. | 219/497 |
| 4,166,381 | 9/1979 | Woo | 73/54 |
| 4,223,207 | 9/1980 | Chow | 219/497 |
| 4,297,884 | 11/1981 | Lêvêque et al. | 73/579 |
| 4,323,763 | 4/1982 | Goldsmith | 219/497 |
| 4,334,147 | 6/1982 | Payne | 219/497 |
| 4,337,388 | 6/1982 | July | 219/501 |
| 4,346,339 | 8/1982 | Lewandowski | 323/245 |
| 4,362,924 | 12/1982 | Story et al. | 219/497 |
| 4,377,739 | 3/1983 | Eckert, Jr. et al. | 219/497 |
| 4,404,461 | 9/1983 | Sitek et al. | 219/490 |
| 4,418,573 | 12/1983 | Madigosky | 73/574 |
| 4,467,182 | 8/1984 | Merkel | 219/497 |
| 4,523,084 | 6/1985 | Tamura et al. | 219/497 |
| 4,546,239 | 10/1985 | Sugimori | 219/497 |
| 4,554,439 | 11/1985 | Cross et al. | 219/497 |

Primary Examiner—M. H. Paschall
Attorney, Agent, or Firm—Hilmar L. Fricke

[57] ABSTRACT

A power control device for controlling power to a resistance heater in an oven uses a microprocessor, temperature measuring circuit, power measuring circuit, a triac circuit for firing the heater, a power phase synchronizer whereby the microprocessor synchronizes A.C. current signal and allows the triac to fire for a calculated portion of each phase of A.C. current to provide power to the heater such that the oven temperature is accurately controlled. A cooling device for cooling to subambient temperature such as −150° C. also is provided. The power control device and oven are used in conjunction with instruments such as a dynamic mechanical analyzer so that physical data on test samples can be obtained over a wide temperature range.

8 Claims, 2 Drawing Figures

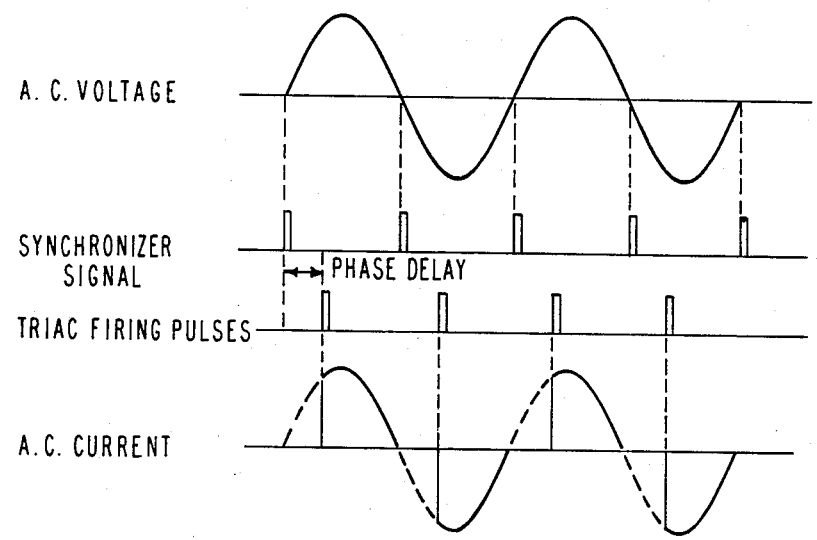

POWER CONTROL DEVICE FOR A RESISTANCE HEATER IN AN OVEN

BACKGROUND OF THE INVENTION

This invention relates to a circuit for controlling the electrical power supplied to the resistance heater in an oven.

A number of devices and electrical circuits have been developed to control power supplied to a resistance heater in an oven. These ovens are used in analytical instruments such as a dynamic mechanical analyzer wherein samples being tested are held at a given temperature while physical properties of the sample are being measured by the instrument. The physical properties of a sample are directly related to temperature and therefore, it is necessary to accurately control temperature. A number of tests require physical properties over a wide range of temperatures, e.g. from $-100°$ C. to $500°$ C., and to meet such a temperature range the oven must be able to rapidly and accurately increase and decrease temperature. One problem that occurs when attempting to control temperature is that power supplied to the heater often fluctuates. Another problem is the inability to accurately control temperature variations of the oven often due to an inadequate feedback control and inadequate control of the oven heater.

A solution to the power supply problem is shown in McGhee U.S. Pat. No. 3,553,458 issued Jan. 5, 1971 in which power supplied to the heater is controlled by monitoring voltage supplied to the heater. This is accomplished through a voltage squaring circuit that generates a control signal proportional to the average value of the square of the voltage and a proportional controller compares the control signal with an error signal and thereby controls the power supplied to the load. This method relies on an average value of the square of the voltage and only a limited degree of precision is obtained.

Chow U.S. Pat. No. 4,223,207 issued Sept. 16, 1980 proposes another solution to the problem by measuring voltage to the heater and generating an error signal and through a comparator varies the power supplied to the heater. This technique continually changes power supplied to the heater since there must be an error signal to provide power to the heater. If there is no error signal power is not supplied to the heater and oven temperature will drop which triggers an error signal to supply power.

What is desired is a control system which will maintain a constant power supply to the heater that will maintain the oven at a constant temperature with minimum variations in temperatures. Also, it is desireable to have a means which would rapidly cool the oven particularly to temperatures below ambient temperatures and maintain the oven at such temperatures.

SUMMARY OF THE INVENTION

An improved power control device that controls the electrical power supplied from an alternating current (A.C) power source to an electrical resistance heater in an oven; wherein the improvement is as follows:

a. a microprocessor containing a temperature setting means, a power measuring unit, a power controller that uses proportional, integral and derivative controller technique and calculating means for determining desired power level;

b. a temperature measuring means positioned in the oven and electrically connected to the temperature setting means of the microprocessor, whereby a signal is fed from the temperature measuring means to the microprocessor and the desired power level is calculated;

c. a power measuring circuit that measures the power being fed to the heater wherein the voltage and amperage values are determined and fed into the power measuring means of the microprocessor; wherein the calculating means of the microprocessor compares the desired power level to the measured power level and feeds the resulting power requirement to the power controller unit of the microprocessor;

d. a triac circuit that contains a triac electrically connected to the heater and to the power controller of the microprocessor; and e. a power phase synchronizer electrically connected to the A.C. power source and to the power controller unit; whereby the power control unit of the microprocessor through the portional, integral and derivative controller technique synchronizes the A.C. current and allows the triac of the triac circuit to fire for a calculated portion of each phase of A.C. current to provide power to the heater in the oven such that the temperature of the oven is accurately controlled at the set temperature.

Another aspect of this invention is a cooling device attached to the oven which allows for rapid cooling of the oven below ambient temperatures and maintenance of the oven at a cold temperature. The cooling device uses a temperature control device similar to the device described above.

BRIEF DESCRIPTION OF THE DRAWINGS

FIG. 2 shows A.C. current and voltage curves a synchronizer signal in conjunction with the triac firing pulses based on signals from the microprocessor.

DESCRIPTION OF THE INVENTION

Figure 1:
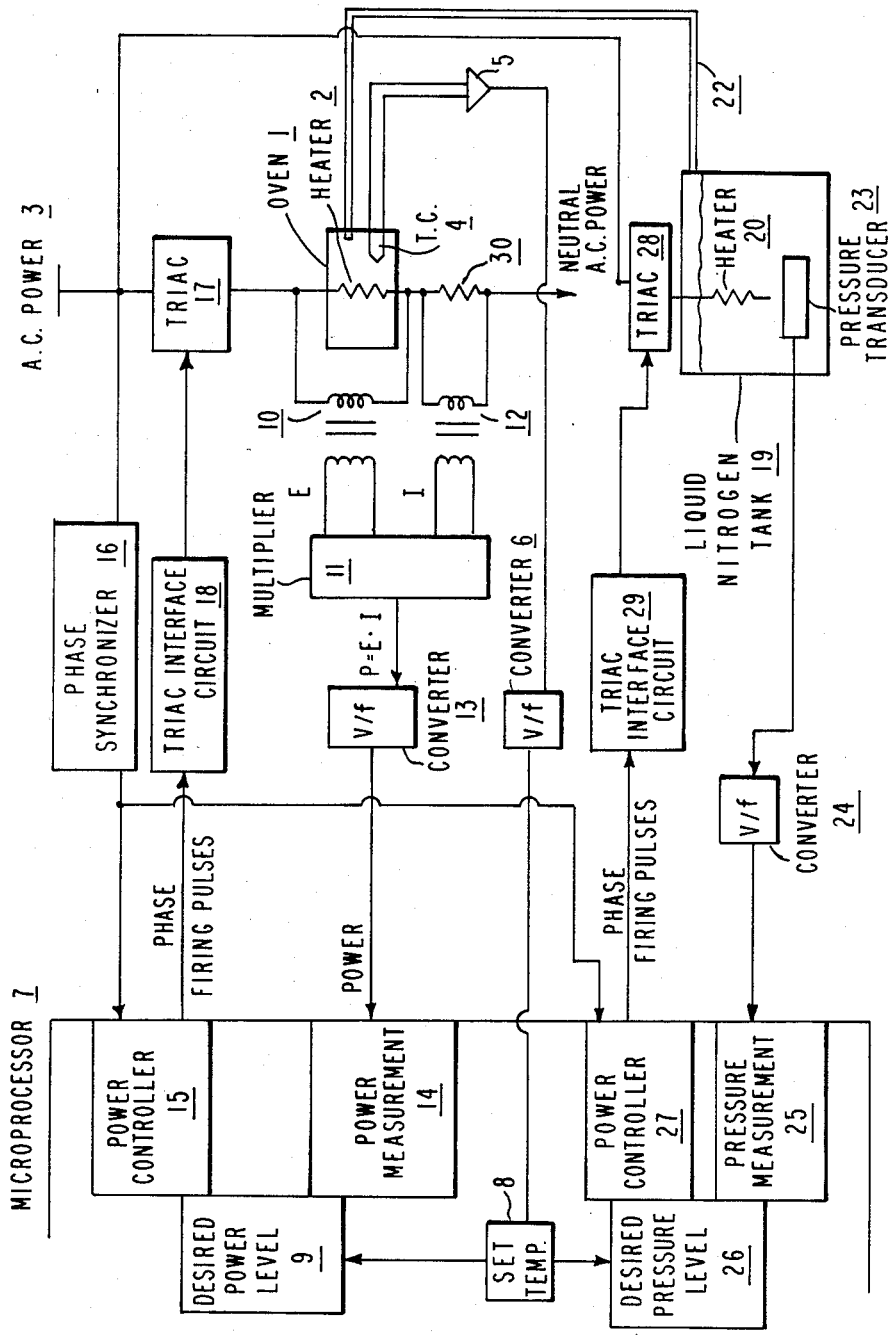
FIG. 1 shows a block diagram of the control device for heating and cooling.

The improved power control device accurately controls power supplied to a heater in an oven by constantly monitoring oven temperature and monitoring and controlling power being supplied to the heater. Temperature is maintained at a constant level in the oven with minimum variations. Also, temperatures of the oven can be rapidly and accurately increased or decreased by the control device. Another aspect of the invention is a cooling device which utilizes a similar power control device to provide a cooling liquid or gas, e.g. nitrogen, to the oven to allow for rapid cooling of the oven below ambient temperatures and accurately maintaining the lower temperature. With the above control device an oven can be maintained in the range of about $-150°$ C. to $500°$ C. and can be rapidly changed for example from $100°$ C. to $-50°$ C. Many physical tests performed by instruments, such as a dynamic mechanical analyzer, require physical data over a wide range of temperatures and the improved power control device and heater can be used with such instrument.

FIG. 1 shows the power control circuit. An oven 1, typically an insulated double wall flask such as a Dewar Flask, having a resistance type heater 2, typically, a heater wire of Kanthal alloy is connected to an alternating current (A.C.) power source 3. A thermocouple (T.C.) 4 is positioned in the oven 1 and a voltage signal from the T.C. which is directly related to oven temperature is fed to an operational amplifier 5, typically, an OP-07 with the necessary reference junction circuitry. The amplified signal is then fed into a voltage/frequency (v/f) converter 6 and then to the microprocessor 7, typically an Intel 80186 microprocessor.

The microprocessor 7 generally has a keyboard which allows an operator to set a temperature, shown as set temp 8 on FIG. 1, a programmed series of temperatures or a ramp between two temperatures. The set temp feeds the desired temperature which is compared to the oven temperature as determined from the T.C. frequency signal. The microprocessor 7 then calculates the desired power level 9 using the following iterative equations.

$$\text{temp error} = \text{set temp} - \text{oven temp}$$

$$\text{error sum} = \text{error sum} + \text{temp error}$$

$$\text{desired power} = (P \times \text{temp error}) + (I \times \text{error sum}) + D \times (\text{oven temp}_n - \text{oven temp}_{n-1})$$

where P, I and D are proportional, integral and derative constants tuned for optimum performance.

The above iterative equations are based on the following difference equation:

$$\text{desired power} = Pe + I \sum_{o}^{n} e\Delta t + D \frac{e_n - e_{n-1}}{\Delta t}$$

where
P is the proportional constant
e is the temperature error
I is the integral constant
$\Delta t$ is the sampling interval (time)
D is the derivative constant
n designates the present sampling of the indicated variable, while n−1 is the value from the previous sampling.

The instantaneous power being supplied to the heater 2 is determined by the power measuring circuit which consists of a transformer 10 typically a 12:1 reduction transformer, which is in parallel with the heater 2 and determines the voltage, E, which is fed into a multiplier 11, typically, a Burr Brown 4214. A second transformer 12, typically, a 1:12 step-up transformer, is in parallel with a resistance R30 typically a 0.1 ohm resistor, which is in series with the heater. The current, I, being used by the heater is measured and fed to the multiplier 11. The multiplier 11 converts the voltage E, and current, I into power value using formula P=EI and the power signal is fed to the v/f converter 13 which feeds a frequency signal representing power to the power measurement unit 14 of the microprocessor 7.

The power controller 15 measures the power each half cycle of the power line, compares the desired power level to the measured power and adjusts the delay of the triac 17 firing pulse for the next half cycle of A.C. current. This is done every half cycle using the following iterative equations:

power error sum=power error sum+desired power−measured power phase delay=max delay−(K×power error sum)

where:

max delay is the period of one half cycle (i.e., 8.3 ms@60 Hz).

K is a scale factor for power error sum.

A power phase synchronizing circuit 16 is connected to the A.C. power 3 and feeds the power controller 15 to synchronize it with the A.C. power. The synchronizer circuit basically produces a pulse each time the A.C. power crosses zero volts.

The power controller 15 uses the synchronizer signal as the starting point of each half cycle and produces a triac firing pulse after a delay as determined by the "phase delay" calculation, thereby controlling the power level supplied to the heater. The power controller is connected to the triac 17 through a triac interface circuit 18, typically a driver feeding a pulse transformer connected to the gate of the triac 17.

FIG. 2 illustrates the relationship of the firing cycle of the triac and the resulting A.C. current. The A.C. voltage is monitored by the synchronizer circuit which produces a pulse at each zero crossing. The power controller senses this and starts a timer to delay the triac firing pulses by a predetermined value. When the triac firing pulse appears, the triac will turn on and conduct current for the remainder of that half cycle. This process is repeated each half cycle.

To provide for rapid cooling of the oven or operation below ambient temperatures, the oven can be cooled with nitrogen gas from a liquid nitrogen source. FIG. 1 shows an optional cooling unit that can be used. A liquid nitrogen tank 19 contains liquid nitrogen and a heater 20. The heater is used to generate pressure in the tank which is sensed by the pressure transducer 23 positioned at the output port of the tank. As the pressure builds, a mixture of nitrogen liquid and gas is transferred from the tank to the oven via an insulated transfer tube 22 and thereby cooling the oven 1. The amount of liquid/gas mixture is proportional to the pressure in the tank which is controlled as a function of tempertaure.

A signal from the pressure transducer 23 is fed to the v/f converter 24 which converts the voltage signal to a frequency signal which is then fed to the pressure measurement unit 25 of the microprocessor 7. The desired pressure level unit 26 from the pressure measurement value and the set temperature calculates a desired pressure level and this value is fed to the power controller 27. The power controller 27 and 15 is the same unit but for purposes of this discussion, the power controller will be treated as two separate units. The power controller 27 is connected to the traic 28 through a triac interface circuit 29 and controls the phase firing pulses of the triac 28 which is connected to the heater 20. The power controller allows A.C. current to energize the triac for a calculated portion of the cycle.

The cooling unit allows the oven temperature range to be extended to subambient temperatures as low as −150° C. Also, the cooling unit provides for precision maintenance of subambient temperatures for extended periods of time and allow for testing at such temperatures.

We claim:

1. A power control device for heating and cooling an oven which comprises
   (1) an electric heater power control device for controlling the electric power supplied from an alternating current (A.C.) power source to an electric resistance heater in an oven which accurately controls the temperature of the oven at its set temperature which comprises:

a. microprocessor containing a temperature setting means, a power measuring unit, a power controller unit that uses proportional integral and derivative controller technique and calculating means for determining desired power level; said units and means being operatively interconnected;

b. a temperature measuring means positioned in the oven and electrically connected to to the temperature setting means of the microprocessor whereby a signal is fed from the temperature measuring means to the microprocessor and the desired power level is calculated;

c. a power measuring circuit electrically connected to the power measuring unit of the microprocessor for measuring the power being fed to the heater wherein voltage and amperage values are determined and fed into the power measuring unit; wherein the microprocessor via the calculating means compares the desired power level to the measured power level and feeds the resulting power requirement to the power controller unit of the microprocessor;

d. a triac circuit containing a triac electrically connected to the heater and to the power controller of the microprocessor;

e. a power phase synchronizer electrically connected to the A.C. power source and to the power controller unit; whereby the power controller unit of the microprocessor through the proportional, integral and derivative controller technique synchronizes the A.C. current signal and allows the triac of the triac circuit to fire for a calculated portion of each phase of A.C. current to provide power to the heater in the oven such that the temperature of the oven is accurately controlled at the set temperature;

(2) power control circuit for a cooling unit attached to the oven for maintaining the oven at subambient temperature or for reducing oven temperatures used in combination with the power control device which comprises a. the microprocessor containing temperature setting means, a gas pressure measuring unit, a power controller unit that uses proportional integral and derivative controller techniques and calculating means for determining gas pressure;

b. a pressure tank containing liquid and gas for cooling and is connected to the oven;

c. a pressure transducer positioned at the tank for measuring pressure in the tank and electrically connected to the gas pressure measuring unit of the microprocessor;

d. a heater unit positioned in the tank which heats the liquid and gas in the tank and thereby forcing the liquid and gas into the oven; and e. a triac circuit containing a triac electrically connected to the heater and to the power controller unit of the microprocessor, whereby the power controller unit of the microprocessor through the proportional, integral and derivative controller technique synchronizes the A.C. current signal and allows the triac of the triac circuit to fire for a calculated portion of each phase of A.C. current to provide power to the heater in the pressure tank to heat liquid in the tank which forces liquid and gas to the oven such that the temperature of the oven is accurately controlled at a subambient set temperature.

2. The power control circuit for the cooling unit of claim 1 in which a voltage/frequency converter is electrically connected to the pressure transducer and the gas pressure measuring unit of the microprocessor which converts the signal of the transducer into a frequency that can be counted by the microprocessor.

3. The power control circuit for the cooling unit of claim 1 in which the triac curcuit comprises a triac interface circuit electrically connected to the triac and to the power controller unit which converts phase firing pulses determined by the power controller unit to a signal that is transmitted to the triac so that the triac fires for the calculated portion of each phase of A.C. current.

4. The power control circuit for the cooling unit of claim 1 in which the liquid and gas in the tank is nitrogen.

5. The power control device for the heater in the oven of claim 1 in which the temperature measuring means comprises a thermocouple, an amplifier electrically connected to the thermocouple which amplifies the voltage signal generated by the thermocouple and a voltage/frequency converter electrically connected to the amplifier and the microprocessor which converts the voltage signal generated by the thermocouple to a frequency that can be counted by the microprocessor.

6. The power control device for the heater in the oven of claim 1 in which the power measuring circuit comprises a transformer which is connected in parallel to the heater and electrically connected to one input of a multiplier to measure voltage and a second transformer is connected in parallel to a resistor and electrically connected to second input of the multiplier to measure current and the multiplier converts the voltage and current signals to a power signal, a voltage/frequency converter electrically connected to the multiplier which receives the power signal and converts the signal to a frequency signal that is fe to the power measuring unit of the microprocessor.

7. The power control device of claim 1 in which the triac circuit of the electric heater comprises a triac interface circuit electrically connected to the triac and to the power controller unit which converts phase firing pulses determined by the power controller unit to a signal 8. The power control device of claim 1 in which the microprocessor controls power according to the following difference equation:

$$\text{desired power} = Pe + I \sum_{o}^{n} e\Delta t + D \frac{Cn - Cn - 1}{\Delta t}$$

wherein
 P is the proportional constant
 e is the temperature error
 I is the integral constant
 $\Delta t$ is the sampling interval (time)
 D is the derivative constant
 n designates the present sampling of the indicated variable, while n−1 is the value from the previous sampling.

* * * * *

UNITED STATES PATENT AND TRADEMARK OFFICE
CERTIFICATE OF CORRECTION

PATENT NO. : 4,720,623

DATED : January 19, 1988

INVENTOR(S) : John M. DiCesare and Ludwig C. Semanski

It is certified that error appears in the above-identified patent and that said Letters Patent is hereby corrected as shown below:

Claim 6, Column 6, line 41, "fe" should be --fed--

Claim 7, Cloumn 6, line 48, add the following after "signal", --that is transmitted to the triac so that the triac fires for the calculated portion of each phase of A.C. current.--

Claim 8, Column 6, line 54,

"desired power $= Pe + I\epsilon\sum_{o}^{n}\Delta t + D\frac{Cn - Cn - 1}{\Delta t}$" should be --desired power $= Pe + I\epsilon\sum_{o}^{n}\Delta t + D\frac{e_n - e_{n-1}}{\Delta t}$ --

Signed and Sealed this

Thirty-first Day of January, 1989

*Attest:*

DONALD J. QUIGG

*Attesting Officer*    *Commissioner of Patents and Trademarks*